United States Patent
Szostak et al.

(10) Patent No.: US 10,414,426 B2
(45) Date of Patent: Sep. 17, 2019

(54) STEERING SHAFT ASSEMBLY HAVING A SLEEVE

(71) Applicant: STEERING SOLUTIONS IP HOLDING CORPORATION, Saginaw, MI (US)

(72) Inventors: Chase A. Szostak, Saginaw, MI (US); Joen C. Bodtker, Gaines, MI (US); Damian Z. Gosztyla, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 5 days.

(21) Appl. No.: 15/676,462

(22) Filed: Aug. 14, 2017

(65) Prior Publication Data
US 2019/0047607 A1  Feb. 14, 2019

(51) Int. Cl.
*B62D 1/185* (2006.01)
*F16D 1/10* (2006.01)

(52) U.S. Cl.
CPC .............. *B62D 1/185* (2013.01); *F16D 1/10* (2013.01); *F16D 2001/103* (2013.01)

(58) Field of Classification Search
CPC ........ B62D 1/183; B62D 1/184; B62D 1/185; B62D 1/187; F16D 1/10; F16D 2001/103
See application file for complete search history.

(56) References Cited

U.S. PATENT DOCUMENTS

| | | | | |
|---|---|---|---|---|
| 2,089,168 A * | 8/1937 | Brown | ........... | F16D 1/0882 403/259 |
| 2,466,097 A * | 4/1949 | Graue | ........... | F16D 1/0876 403/356 |
| 4,667,530 A * | 5/1987 | Mettler | ........... | B62D 1/185 403/225 |
| 5,460,574 A * | 10/1995 | Hobaugh | ........... | F16C 3/03 403/359.2 |
| 5,640,884 A * | 6/1997 | Fujiu | ........... | B29C 45/14491 280/777 |
| 5,678,454 A * | 10/1997 | Cartwright | ........... | B62D 1/184 74/493 |
| 5,791,686 A * | 8/1998 | Moriyama | ........... | B62D 1/192 280/777 |
| 5,807,180 A * | 9/1998 | Knodle | ........... | F16D 1/0882 403/357 |
| 6,223,619 B1 | 5/2001 | Shibata et al. | | |
| 7,559,266 B2 * | 7/2009 | Kurokawa | ........... | B62D 1/185 180/89.12 |
| 2002/0030356 A1 * | 3/2002 | Bohlen | ........... | B62D 1/192 280/777 |

(Continued)

OTHER PUBLICATIONS

English translation of Office Action regarding related DE App. No. 10 2018 119 155.3; dated Apr. 28, 2019; 7 pgs.

*Primary Examiner* — Frank B Vanaman

(57) ABSTRACT

A telescopically translatable steering shaft assembly includes a steering shaft and a sleeve. The steering shaft defines a first plurality of splines extending from a first steering shaft end towards a second steering shaft end along a steering column axis. The sleeve has a first elongate member that extends between a first sleeve end that is disposed about the first steering shaft end and a second sleeve end that is disposed about an end of the first plurality of splines. The first elongate member is disposed on a first spline of the first plurality of splines.

15 Claims, 3 Drawing Sheets

(56) References Cited

U.S. PATENT DOCUMENTS

| | | | | |
|---|---|---|---|---|
| 2005/0199087 A1* | 9/2005 | Li | ............... | B62D 1/181 74/493 |
| 2008/0000316 A1 | 1/2008 | Kurokawa | | |
| 2013/0228034 A1* | 9/2013 | Hebenstreit | ............. | B21C 23/18 74/493 |
| 2013/0343815 A1* | 12/2013 | Kenawy | ............... | F16D 1/101 403/359.1 |
| 2015/0110551 A1* | 4/2015 | Aoki | ............... | F16D 1/02 403/359.1 |

* cited by examiner

STEERING SHAFT ASSEMBLY HAVING A SLEEVE

BACKGROUND

Vehicles are provided with a steering column assembly that supports a steering wheel. The steering column assembly may be telescopically adjustable by an inner or outer member moving relative to each other. A bushing may be provided between the inner and outer member to facilitate sliding motion between the inner member and the outer member. The bushing may be injection molded in place between the inner and outer members to provide a custom fit for each steering column assembly or may be injected in separate tooling. This custom fit injection molded bushing may result in substantial variability between steering column assemblies that are produced.

Accordingly, it is desirable to provide an improved bushing with less manufacturing variability.

SUMMARY

According to an embodiment of the present disclosure, a telescopically translatable steering shaft assembly is provided. The telescopically translatable steering shaft assembly includes a steering shaft and a sleeve. The steering shaft extends along a steering column axis between a first steering shaft end and a second steering shaft end. The steering shaft defines a first plurality of splines extending from the first steering shaft end towards the second steering shaft end. The sleeve has a first sleeve end, a second sleeve end, and a first elongate member. The first sleeve end is disposed about the first steering shaft end of the steering shaft. The second sleeve end is disposed about an end of the first plurality of splines. The first elongate member extends between the first sleeve end and the second sleeve end and is disposed along a surface of a first spline of the first plurality of splines.

According to another embodiment of the present disclosure, a steering shaft assembly is provided. The steering shaft assembly includes a steering shaft and a sleeve. The steering shaft defines a first plurality of splines extending from a first steering shaft end towards a second steering shaft end along a steering column axis. The sleeve has a first elongate member and a second elongate member. Each elongate member extends between a first sleeve end that is disposed about the first steering shaft end and a second sleeve end that is disposed about an end of the first plurality of splines. The first elongate member is disposed on a first spline of the first plurality of splines and the second elongate member is disposed on a second spline of the first plurality of splines.

These and other advantages and features will become more apparent from the following description taken in conjunction with the drawings.

BRIEF DESCRIPTION OF THE DRAWINGS

The subject matter of the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
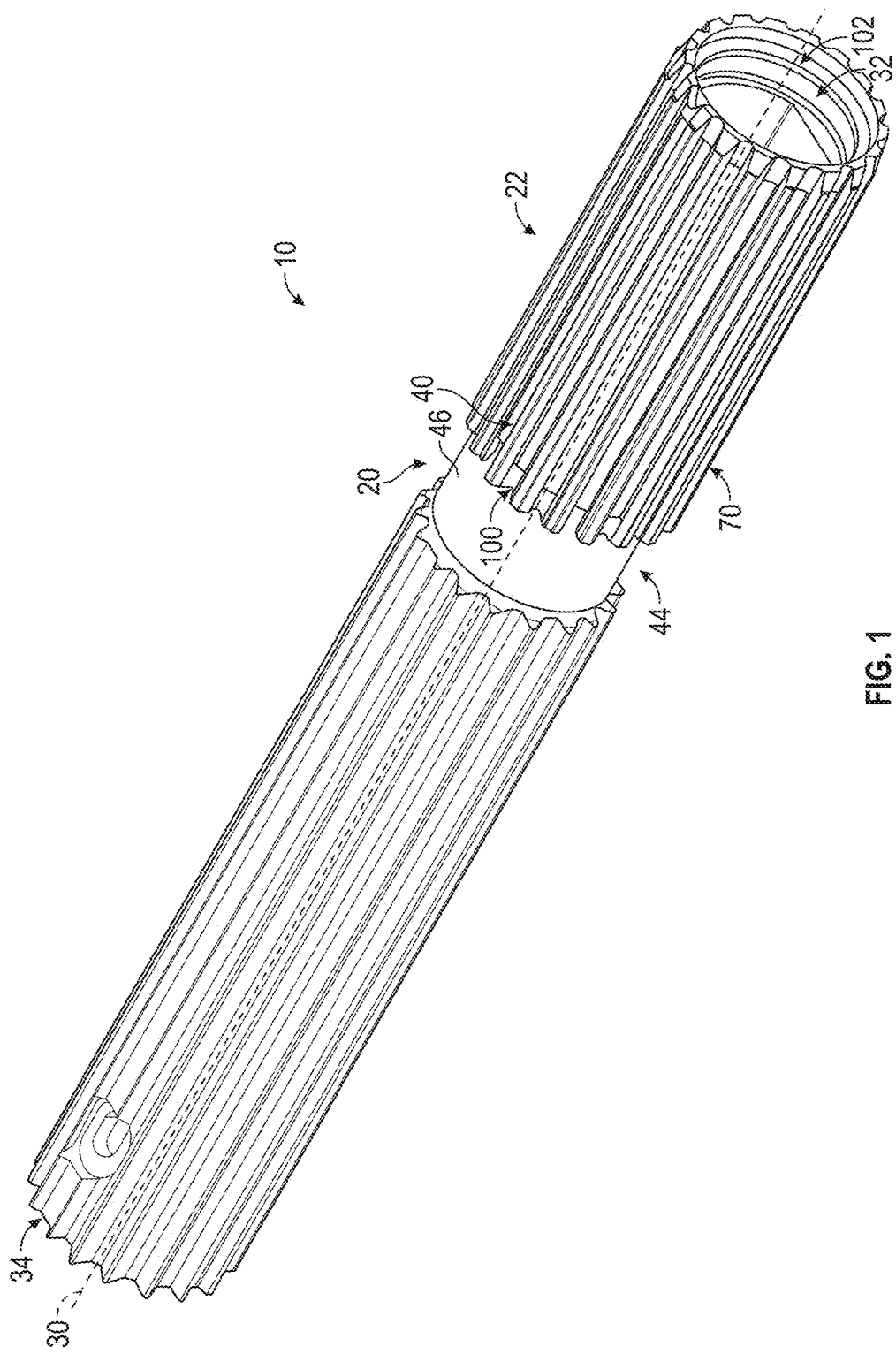
FIG. 1 is a perspective view of a steering shaft assembly having a sleeve.

A vehicle steering column assembly is supported within a vehicle and may be adjustable relative to an operator of the vehicle. The steering column assembly may be adjusted by tilt, rake, or telescopic movement. The steering column assembly includes a steering shaft assembly 10 that is telescopically translatable and is arranged to enable the steering column assembly to be telescopically moved or adjusted. Referring to FIG. 1, the steering shaft assembly 10 includes a steering shaft 20 and the sleeve 22.

The steering shaft 20 extends along a steering column axis 30 between a first steering shaft end 32 and the second steering shaft end 34. The first steering shaft end 32 may be received within another steering member to facilitate telescopic movement of at least a portion of the steering column assembly. The first steering shaft end 32 includes an end surface 36 that is disposed transverse to the steering column axis 30, as shown in FIG. 4.

Figure 4:
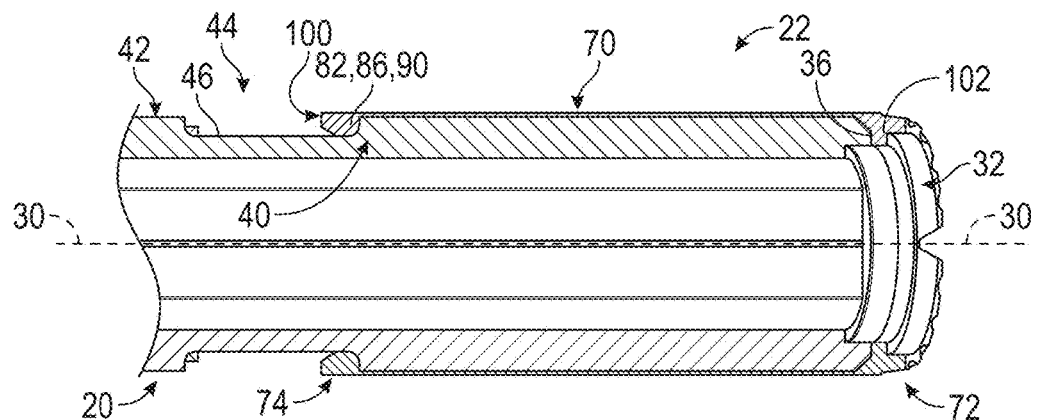
FIG. 4 is a side cross-sectional view of the steering shaft assembly having the sleeve.

Referring to FIGS. 1 and 4, the steering shaft 20 defines a first plurality of splines 40. The first plurality of splines 40 may be interrupted by a recessed region 44 having a surface 46. The surface 46 extends between an end of a first portion of the first plurality of splines 40 and an end of a second portion of the first plurality of splines. The surface 46 may be an outer surface of the steering shaft 20.

Figure 5:
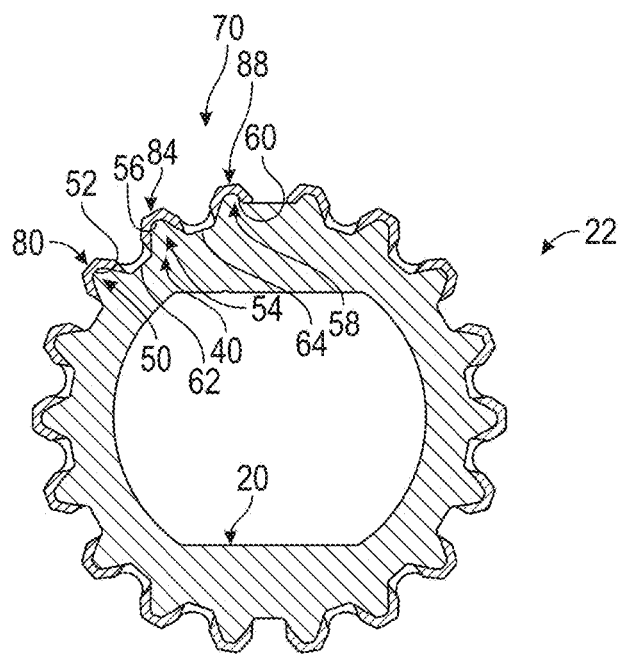
FIG. 5 is an end cross-sectional view of the steering shaft assembly having the sleeve.

Referring to FIGS. 1, 4, and 5, the first plurality of splines 40 extend from the first steering shaft end 32 towards the second steering shaft end 34 along the steering column axis 30. The first plurality of splines 40 extend from the first steering shaft end 32 to the recessed region 44. The first plurality of splines 40 includes a first tooth or a first spline 50 having a first spline surface 52, a second tooth or a second spline 54 having a second spline surface 56, a third tooth or a third spline 58 having a third spline surface 60. The first spline surface 52 is disposed generally parallel to the surface 46 and the steering column axis 30. The second spline 54 is spaced apart from the first spline 50. The second spline surface 56 is spaced apart from the first spline surface 52 and is disposed generally parallel to the surface 46 and the steering column axis 30. The third spline 58 is spaced apart from the first spline 50 and the second spline 54. The third spline surface 60 is disposed generally parallel to the surface 46 and the steering column axis 30.

A first root 62 is defined between the first spline 50 and the second spline 54. The first root 62 extends generally parallel to the steering column axis 30. The second root 64 is defined between the second spline 54 and the third spline 58. The second root 64 extends generally parallel to the steering column axis 30.

The sleeve 22 is disposed about at least a portion of the first steering shaft end 32 and extends towards the second steering shaft end 34. The sleeve 22 may be disposed about the first plurality of splines 40. In at least one embodiment, the sleeve 22 is disposed about at least a portion of the second steering shaft end 34 and extends towards the first steering shaft end 32.

The sleeve 22 is pre-formed or pre-molded part that is assembled onto an end or a portion of the steering shaft 20. The sleeve 22 is a bushing, bearing, or interface member that is arranged to facilitate sliding movement of a component of the steering column assembly relative to the steering shaft 20.

Referring to FIGS. 1-4, the sleeve 22 includes a plurality of the elongate members 70 extending between a first sleeve end 72 and a second sleeve end 74. The first sleeve end 72 is disposed about the first steering shaft end 32. The second sleeve end 74 is disposed about an end of the first plurality of splines 40.

The plurality of elongate members 70 are spaced apart from the first root 62 and the second root 64 such the plurality of elongate members 70 are not disposed on or within the roots to decrease the loads of the slip joint that is defined between the sleeve 22 and a mating component. The plurality of elongate members 70 include a first elongate member 80 having a first retention tab 82, a second elongate member 84 having a second retention tab 86, and a third elongate member 88 having a third retention tab 90.

The first elongate member 80 extends between the first sleeve end 72 and the second sleeve end 74. The first elongate member 80 is disposed on or disposed along the first spline surface 52 of the first spline 50 of the first plurality of splines 40.

The first retention tab 82 extends from an end of the first elongate member 80 that is disposed proximate the second sleeve end 74. The first retention tab 82 extends about an end of the first spline 50 of the first plurality of splines 40 and extends towards the steering column axis 30. The first retention tab 82 engages the surface 46 of the recessed region 44, as shown in FIG. 4. The first retention tab 82 is arranged to retain the first elongate member 80 on the first spline 50 of the first plurality of splines 40.

The second elongate member 84 is spaced apart from the first elongate member 80 and extends between the first sleeve end 72 and the second sleeve end 74. The second elongate member 84 is disposed on or disposed along the second spline surface 56 of the second spline 54 of the first plurality of splines 40.

The second retention tab 86 extends from an end of the second elongate member 84 that is disposed proximate the second sleeve end 74. The second retention tab 86 extends about an end of the second spline 54 of the first plurality of splines 40 and extends towards the steering column axis 30. The second retention tab 86 engages the surface 46 of the recessed region 44. The second retention tab 86 is arranged to retain the second elongate member 84 on the second spline 54 of the first plurality of splines 40.

The third elongate member 88 is spaced apart from the first and second elongate members 80, 84 and extends between the first sleeve end 72 and the second sleeve end 74. The third elongate member 88 is disposed on or disposed along the third spline surface 60 of the third spline 58 of the first plurality of splines 40.

The third retention tab 90 extends from an end of the third elongate member 88 that is disposed proximate the second sleeve end 74. The third retention tab 90 extends about an end of the third spline 58 of the first plurality of splines 40 and extends towards the steering column axis 30. The third retention tab 90 engages the surface 46 of the recessed region 44. The third retention tab 90 is arranged to retain the third elongate member 88 on the third spline 58 of the first plurality of splines 40.

The sleeve 22 includes an extension member 100 and a connecting member 102. The extension member 100 is disposed proximate the second sleeve end 74 and extends between the first elongate member 80, the second elongate member 84, and the third elongate member 88. The extension member 100 extends towards the first root 62 and/or the second root 64. The extension member 100 may engage the surface 46, as shown in FIG. 4.

Figure 3:
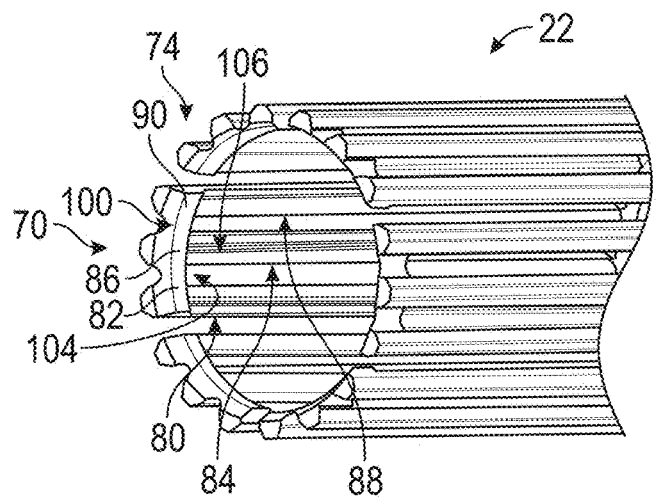
FIG. 3 is a partial perspective view of the sleeve.

The extension member 100 may also define or interconnect the first retention tab 82, the second retention tab 86, and the third retention tab 90, as shown in FIG. 3. The extension member 100 may contact an end of the first plurality of splines 40 and may engage the surface 46 of the recessed region 44.

The extension member 100 is arranged to operatively connect the first elongate member 80 with the second elongate member 84 and with the third elongate member 88, such that the plurality of elongate members 70 are grouped into groups of three. While disclosed as groups of three, other groupings of the plurality of elongate members 70 are also considered such as groups of two or more and additionally the plurality of elongate members 70 may not be grouped together but are individual elongate member that are spaced apart from each other. The grouping of the first elongate member 80 of the second elongate member 84 and/or the third elongate member 88 by the extension member 100 segments the second sleeve end 74 of the sleeve 22 into discrete segments such that the second sleeve end 74 is a discontinuous ring.

The connecting member 102 is disposed proximate the first sleeve end 72 and extends towards the steering column axis 30. The connecting member 102 may abut the end surface 36 of the steering shaft 20. The connecting member 102 may be configured as an arcuate ring that is disposed about an outer periphery of the end surface 36 of the steering shaft 20.

Figure 2:
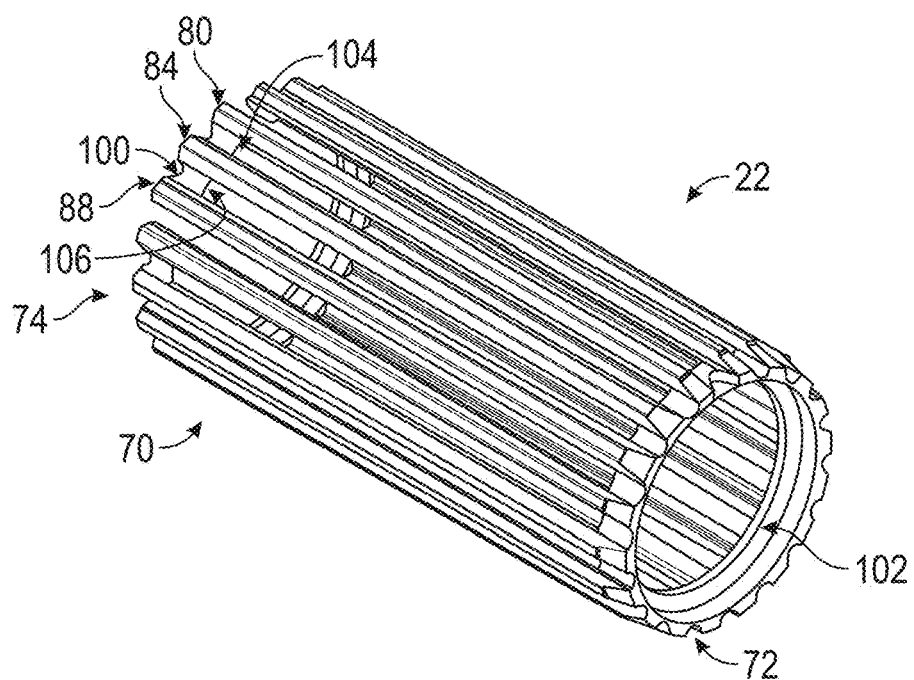
FIG. 2 is a perspective view of the sleeve.

The first elongate member 80, the second elongate member 84, the extension member 100, and the connecting member 102 to define a first opening 104 of the sleeve 22, as shown in FIGS. 2 and 3. The first opening 104 is aligned or disposed over the first root 62 of the first plurality of splines 40. The second elongate member 84, the third elongate member 88, the extension member 100, and a connecting member 102 define a second opening 106 of the sleeve 22, as shown in FIGS. 2 and 3. The second opening 106 is aligned or disposed over the second root 64 of the first plurality of splines 40.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments or combinations of the various embodiments. Accordingly, the present disclosure is not to be seen as limited by the foregoing description.

Having thus described the present disclosure, it is claimed:

1. A telescopically translatable steering shaft assembly, comprising:
    a steering shaft extending along a steering column axis between a first steering shaft end and a second steering shaft end, the steering shaft defining a first plurality of splines extending from the first steering shaft end towards the second steering shaft end and a second plurality of splines that are axially spaced apart from the first plurality of splines by a recessed region of the steering shaft; and
    a sleeve, comprising:
        a first sleeve end being disposed about the first steering shaft end of the steering shaft,
        a second sleeve end being disposed about an end of the first plurality of splines,
        a first elongate member extending between the first sleeve end and the second sleeve end and disposed along a surface of a first spline of the first plurality of splines, the first elongate member having a first retention tab disposed proximate the second sleeve end, the retention tab extending about an end of the first plurality of splines and extending towards the steering column axis, and
        a connecting member disposed proximate the first sleeve end and extending towards the steering column axis, the connecting member abutting an end surface of the first shaft end.

2. The steering shaft assembly of claim 1, the sleeve further comprising:
    a second elongate member spaced apart from the first elongate member and extending between the first sleeve end and the sleeve end and disposed along a surface of a second spline of the first plurality of splines.

3. The steering shaft assembly of claim 2, wherein the second elongate member is provided with a second retention tab that is disposed proximate the second sleeve end.

4. The steering shaft assembly of claim 3, wherein the second retention tab extends about an end of the second spline and extends towards the steering column axis.

5. The steering shaft assembly of claim 3, wherein the sleeve further comprising:
    an extension member extending between the first elongate member and the second elongate member, the extension member being disposed proximate the second sleeve end.

6. The steering shaft assembly of claim 5, wherein a first root is defined between the first spline and the second spline.

7. The steering shaft assembly of claim 6, wherein the extension member is spaced apart from the first root.

8. The steering shaft assembly of claim 6, wherein the first elongate member and the second elongate member are spaced apart from the first root.

9. A steering shaft assembly, comprising:
    a steering shaft defining a first plurality of splines extending from a first steering shaft end towards a second steering shaft end along a steering column axis and a second plurality of splines that are axially spaced apart from the first plurality of splines by a recessed region of the steering shaft;
    a sleeve having a first elongate member and a second elongate member, each extending between a first sleeve end that is disposed about the first steering shaft end and a second sleeve end that is disposed about an end of the first plurality of splines, the first elongate member being disposed on a first spline of the first plurality of splines and the second elongate member being disposed on a second spline of the first plurality of splines, the first elongate member having a first retention tab disposed proximate the second sleeve end, the retention tab extending about an end of the first plurality of splines and extending towards the steering column axis; and
    a connecting member disposed proximate the first sleeve end and extending towards the steering column axis, the connecting member abutting an end surface of the first shaft end.

10. The steering shaft assembly of claim 9, wherein the first elongate member is provided with a first retention tab that extends from the second sleeve end and extends about an end of the first spline.

11. The steering shaft assembly of claim 10, wherein the second elongate member is provided with a second retention tab that extends from the second sleeve end and extends about an end of the second spline.

12. The steering shaft assembly of claim 11, wherein at least one of the first retention tab and the second retention tab engages a surface of the recessed region that extends between the first plurality of splines and the second plurality of splines along the steering column axis.

13. The steering shaft assembly of claim 9, wherein the sleeve has an extension member that is disposed proximate the second sleeve end and extends between the first elongate member and the second elongate member.

14. The steering shaft assembly of claim 9, wherein the first elongate member, the second elongate member, the extension member, and the connecting member define an opening.

15. The steering shaft assembly of claim 14, wherein the opening is disposed over a first root of the first plurality of splines that is defined between the first spline and the second spline.

* * * * *